(12) United States Patent
O'Neill et al.

(10) Patent No.: US 7,946,263 B2
(45) Date of Patent: May 24, 2011

(54) APPROACH FOR ADAPTIVE CONTROL OF CAM PROFILE SWITCHING FOR COMBUSTION MODE TRANSITIONS

(75) Inventors: Jon O'Neill, Erith (GB); Themi Philemon Petridis, Epping (GB)

(73) Assignee: Ford Global Technologies, LLC, Dearborn, MI (US)

( * ) Notice: Subject to any disclaimer, the term of this patent is extended or adjusted under 35 U.S.C. 154(b) by 502 days.

(21) Appl. No.: 11/971,397

(22) Filed: Jan. 9, 2008

(65) Prior Publication Data

US 2009/0173296 A1 Jul. 9, 2009

(51) Int. Cl.
*F01L 1/34* (2006.01)

(52) U.S. Cl. ............... 123/90.16; 123/295; 123/345; 701/102

(58) Field of Classification Search ......... 123/90.15, 123/90.17, 90.16, 295, 345, 346; 701/101, 701/102
See application file for complete search history.

(56) References Cited

U.S. PATENT DOCUMENTS

| | | | |
|---|---|---|---|
| 6,408,806 B2 | 6/2002 | Sugiyama et al. | |
| 6,536,390 B2 | 3/2003 | Takahashi et al. | |
| 6,622,689 B2 | 9/2003 | Hasegawa et al. | |
| 6,688,275 B2 | 2/2004 | Shindou et al. | |
| 6,755,165 B2 | 6/2004 | Kondou et al. | |
| 7,274,986 B1 * | 9/2007 | Petridis et al. | 701/102 |

* cited by examiner

*Primary Examiner* — Ching Chang
(74) *Attorney, Agent, or Firm* — Julia Voutyras; Alleman Hall McCoy Russell & Tuttle LLP (57) ABSTRACT

A method is disclosed for controlling cylinder valve switching between a first valve condition and a second valve condition for transitioning between combustion modes of an engine. The method includes adjusting timing of a signal to switch between the valve conditions based on an oil degradation condition from an oil sensor, wherein the combustion modes include spark ignition and homogenous charge compression ignition.

19 Claims, 6 Drawing Sheets

APPROACH FOR ADAPTIVE CONTROL OF CAM PROFILE SWITCHING FOR COMBUSTION MODE TRANSITIONS

BACKGROUND AND SUMMARY

Vehicles may include engine systems configured to operate a variety of different combustion modes in order to increase the operating efficiency of the vehicle while meeting speed and load demands across the operational range of the engine. In one example, an engine system may operate in a controlled auto-ignition combustion mode a homogenous charge compression ignition (HCCI) combustion mode to achieve higher thermal efficiency and reduce pumping losses relative to other combustion modes resulting in improvements in fuel economy performance and reductions in emissions. HCCI combustion may be desirable or possible only across a particular operating speed/load range. In order to meet demands outside the operating range of HCCI combustion, the engine system may also be configured to operate in a spark ignition (SI) combustion. By operating in both HCCI and SI combustion modes speed/load demands may be met and operating efficiency of the vehicle may be increased.

Furthermore, an engine system may transition between combustion modes by changing a valve lift profile cooperatively with fuel and spark commands in one or more cylinders of the engine. In one example, a valve lift profile may be adjusted via actuation of a switching tappet of a cylinder valve. The state of the switching tappet may be controlled by an oil circuit. In particular, the oil pressure of the oil circuit may be raised or lowered to change the state of the tappet. A control signal may be sent to the oil circuit to initiate a cam profile switch based on a suitable switch window of engine operation, based on for example, a desired rotational position of the crankshaft or camshaft.

However, the inventors of the present disclosure have recognized some issues with the above approach. In particular, during engine operation, engine oil degradation may occur and the engine oil temperature may vary resulting in changes in the response time of the oil circuit to perform a cam profile switch. The changes in response time of the oil circuit may cause early or late cam profile switches that occur outside the suitable switch window of engine operation. The early or late switches may result in torque jumps, increased noise, vibration, harshness (NVH), increased emissions and reduced fuel economy performance, among other operational efficiency penalties.

In at least one approach described herein, at least some of the above issues may be addressed by a method of controlling cylinder valve switching between a first valve condition and a second valve condition for transitioning between combustion modes of an engine, comprising: adjusting timing of a signal to switch between the valve conditions based on an oil degradation condition from an oil sensor, wherein the combustion modes include spark ignition and homogenous charge compression ignition.

By adjusting cam profile switching signal timing relative to crankshaft and/or camshaft rotation based on oil degradation using an oil sensor, cam profile switching synchronization may be maintained throughout engine operation even as engine oil degrades. In particular, the oil sensor may provide degradation oil readings that have improved accuracy over predictive algorithms since the oil sensor may measure the condition of the engine oil in real time. In this way, cam profile switching may be performed in a suitable operating window and torque jumps, NVH, emissions, fuel consumption and other operational efficiency penalties may be reduced.

Furthermore, the signal timing of a cam profile switch may be adjusted based on engine oil temperature as measured by the oil sensor since the viscosity of the engine oil may change at different temperatures resulting in changes in the oil circuit response time. In one particular example, the oil sensor may be configured to measure the temperature of the engine oil directly from rotating components of the engine, such as for example, the oil film of the rotating camshaft. The oil sensor may provide a more accurate reading over a temperature measurement of engine coolant since a temperature delta may exist between engine coolant and engine oil based on the transient dynamics of engine oil temperature occurring more rapidly over the generic coolant based engine temperature. By measuring the engine oil temperature using the oil sensor and adjusting the cam profile switching signal based on the oil temperature, control accuracy may be improved. In this way a transition between combustion modes may be preformed with little or no reductions in operating efficiency.

DETAILED DESCRIPTION

Figure 1:
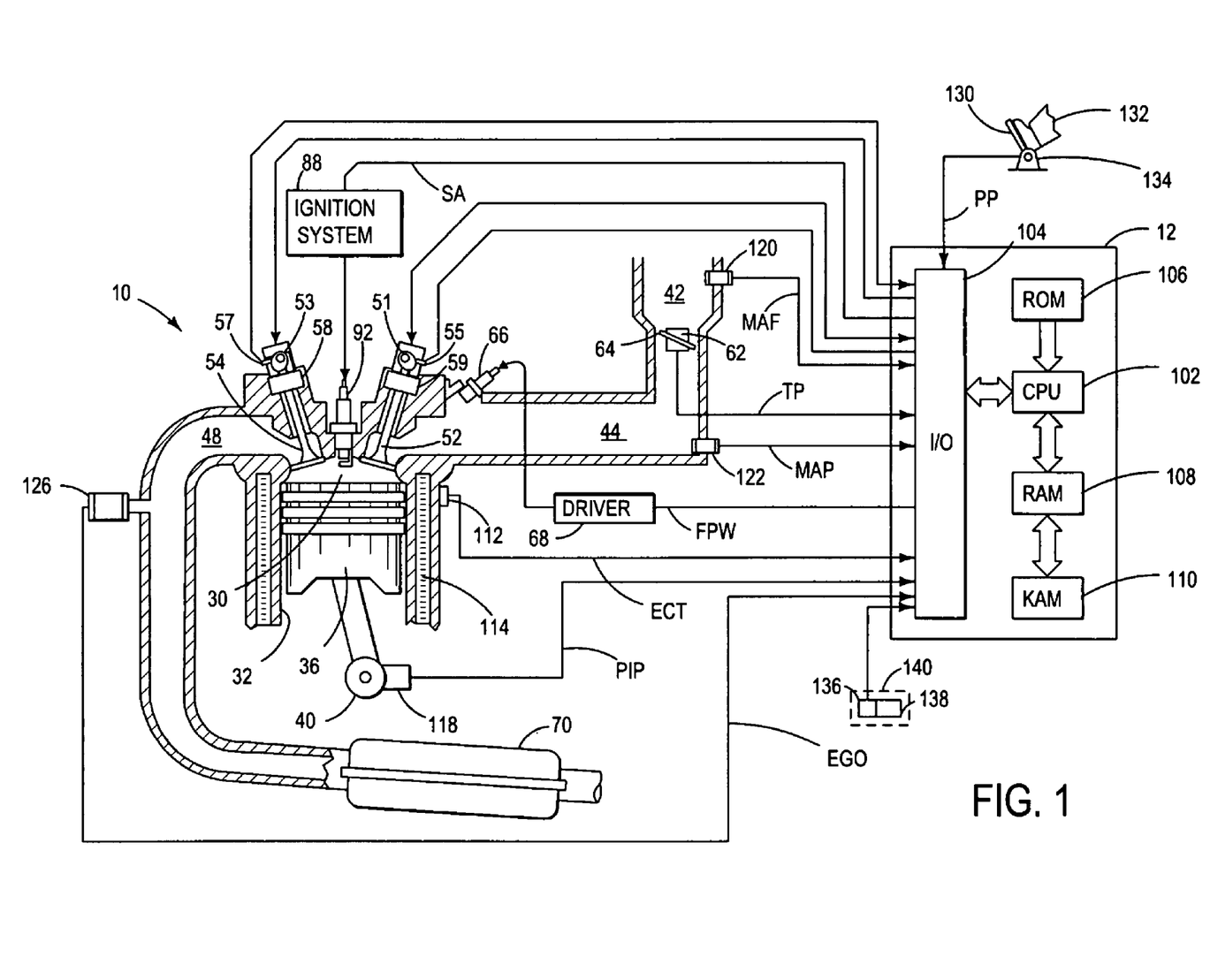
FIG. 1 shows one cylinder of an example engine system.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams. Variable valve lift may be realized, in one example, by cam profile switching (CPS). Cam actuation systems 51 and 53 may each include cam profile switching devices 58 and 59 which may be used to switch between different lift profiles of the respective valves based on the various lobes of the cam(s). Cam actuation systems 51 and 53 may be operated by controller 12 to vary valve operation. More particularly, controller 12 may control operation of the cam profile switching devices to affect valve lift and/or timing. The position of intake valve 52 and exhaust valve 54 may be determined by position sensors 55 and 57, respectively. Cam actuation and cam profile switching will be discussed in further detail below with reference to FIG. 2.

In alternative embodiments, intake valve 52 and/or exhaust valve 54 may be controlled by electric valve actuation. For example, cylinder 30 may alternatively include an intake valve controlled via cam actuation and an exhaust valve controlled via electric valve actuation.

Furthermore, the engine system may include variable cam timing (VCT), variable valve timing (VVT) and/or variable valve lift (VVL) systems to control valve timing and/or lift throughout vehicle operation.

In some embodiments, an exhaust gas recirculation (EGR) system may route a desired portion of exhaust gas from exhaust passage 48 to intake passage 44 via an EGR passage. The amount of EGR provided to intake passage 48 may be varied by controller 12 via an EGR valve. Further, an EGR sensor may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing.

In some embodiments, engine 10 may further include a compression device such as a turbocharger or supercharger including at least a compressor arranged along intake manifold 44. For a turbocharger, compressor may be at least partially driven by a turbine (e.g. via a shaft) arranged along exhaust passage 48. For a supercharger, a compressor may be at least partially driven by the engine and/or an electric machine, and may not include a turbine. Thus, the amount of compression provided to one or more cylinders of the engine via a turbocharger or supercharger may be varied by controller 12.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller (or control system) 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, control system 12 may be in communication with oil sensor 136. In one example, oil sensor 136 may be a sacrificial wear sensor to directly measure a wear characteristic of the engine oil to determine a level of degradation of the engine oil. The sensor may include a sacrificial portion 138 that wears or deteriorates corresponding to the degradation of the engine oil. Oil sensor 136 may be configured to vary the electrical signal (e.g. voltage level) sent to the control system based on the wear of the sacrificial portion in order to provide an indication of the level of oil degradation to the control system. Further, the sacrificial portion of the oil sensor may be replaced at regular service intervals (e.g. at scheduled oil change services) to maintain an accurate wear measurement of the engine oil even upon replacement of the engine oil with clean engine oil. In order to allow for ease of replacement of the sacrificial portion of the oil sensor, the oil sensor may be positioned in the engine system to facilitate easy access to the oil sensor. For example, an oil filler cap of the engine system may be modified to include a robust thermocouple 140 that may include the oil sensor 136 such that the sacrificial portion 138 may be accessible and replaced by removing the oil filler cap. Thermocouple 140 may protect oil sensor 136 from high heat conditions of the engine and oil systems.

As another example, the oil sensor may be positioned proximate to the camshaft via the robust thermocouple and the sacrificial portion of the wear sensor may be in contact with a sensor target integral with the rotating camshaft. Further, the sensor target or the sacrificial portion may include segments of different materials (metallic and/or non-metallic), and may be configured to operate with different clearances or levels of physical contact to simulate the different types and magnitude of wear behavior from the mechanisms of corrosion and abrasion associated with engine oil degradation. The different material of the sacrificial portion of the oil sensor may wear at different rates which may correspond to rates of oil degradation. In one example, the wear of the sacrificial portion may be based on contaminants in the engine oil which may interact with the sacrificial portion and cause wear via abrasion or corrosive reactions. In particular, as the sacrificial portion wears the distance between the sensor target and the sacrificial portion may increase and the sensor may measure the distance between the sensor target and the sacrificial portion to generate an engine oil degradation reading.

Alternate oil sensor or sacrificial portion placement may include but is not limited to, within the oil filter, proximate to an oil drain plug of the oil system, proximate to the oil filler cap, and integral with an oil dipstick. The oil sensor device may be specifically designed to wear at a rate greater than that of particular engine components in order to provide an indication of engine oil degradation. Further, the oil sensor may be placed in a position that facilitates easy replacement of the sacrificial portion. In this way, problems with oil quality may be identified in a timely manner and engine operation may be modified or restricted to account for the condition of the engine oil and/or the vehicle operator may be alerted. It will be appreciated that multiple oil sensors that may measure engine oil degradation and/or engine oil temperature may be placed throughout the engine system and readings of the sensors may be used to control engine operation.

Furthermore, it will be appreciated that engine system 10 may operate in various modes, some of which may be initiated based on temperature of either the engine or the engine oil itself. For example, in order for HCCI combustion to take place the engine has to be sufficiently hot. Engine temperature sensors may be implemented for optimizing engine mode selection such as HCCI operation, and these sensors may be typically placed on the cylinder head (e.g. thermostat housing) to directly measure engine coolant. However it will be appreciated that a temperature delta may exist between the engine coolant and engine oil temperatures. Further, it will be appreciated that the transient dynamics of engine oil temperature may occur rapidly over the generic coolant based engine temperature. Thus, under some conditions, control of engine operation based strictly on engine coolant temperature may be inaccurate relative to control based on engine oil temperature Thus, in some embodiments, oil sensor 136 may be configured to measure and send a temperature reading of the engine oil to control system 12. As discussed above, oil sensor 136 may be incorporated with robust thermocouple 140 which may withstand high engine temperatures and thus the oil sensor may be placed proximate to rotating components where a measurement of oil temperature may be most accurate. In one particular example, the oil sensor may be placed proximate to the camshaft and the oil film temperature across the rotating camshaft may be measured to provide an accurate measurement of engine oil temperature. The adapted engine oil sensor may send varying electrical signals, dependant on exact engine oil temperature (ranging from cold to hot oil) to the control system which may be used to control engine operation over the complete drive cycle.

In some embodiments, the oil sensor may not include a sacrificial portion but rather may include a longer lasting sensing mechanism. Further, in some embodiments, the oil sensor may be incorporated into a standalone robust thermocouple that may be separate from an oil filler cap, dip stick, or other replaceable oil system components.

It will be appreciated that in some embodiments the oil sensor may be configured to measure both oil temperature and oil degradation. Further, in some embodiments the robust thermocouple may include an oil temperature measuring sensor and the oil sensor may be used to measure oil degradation and signals indicative of both measurements may be sent to the control system.

It will be appreciated that the oil sensor as well as other sensors described above may communicate with the controller via wired and/or wireless communication.

As described above, FIG. 1 shows only one cylinder of a multi-cylinder engine, and that each cylinder may similarly include its own set of intake/exhaust valves, fuel injector, spark plug, etc.

Combustion in engine 10 can be of various types/modes, depending on operating conditions. In one example, spark ignition (SI) can be employed where the engine utilizes a sparking device, such as spark plug coupled in the combustion chamber, to regulate the timing of combustion chamber gas at a predetermined time after top dead center of the expansion stroke. In one example, during spark ignition operation, the temperature of the air entering the combustion chamber is considerably lower than the temperature required for auto-ignition. While SI combustion may be utilized across a broad range of engine torque and speed it may produce increased levels of NOx and lower fuel efficiency when compared with other types of combustion.

Another type of combustion that may be employed by engine 10 uses homogeneous charge compression ignition (HCCI), or controlled auto-ignition (CAI), where auto-ignition of combustion chamber gases occurs at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

In compression ignition operation mode, it may be desirable to exercise close control over the timing of auto-ignition. The initial intake charge temperature directly affects the timing of auto-ignition. The start of ignition is not directly controlled by an event such as the injection of fuel in a standard diesel engine or the sparking of the spark plug in a spark ignited engine. Furthermore, the heat release rate is not controlled by either the rate or duration of the fuel-injection process, as in a diesel engine, or by the turbulent flame propagation time, as in a spark-ignited engine.

Note that auto-ignition is also a phenomenon that may cause knock in a spark-ignited engine. Knock may be undesirable in spark-ignited engines because it enhances heat transfer within the cylinder and may burn or damage the piston. In controlled compression ignition operation, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically may be increased to reach auto-ignition conditions at or near the end of the compression stroke. It will be appreciated by those skilled in the art that numerous other methods may be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbo-charging and supercharging), changing the auto-ignition characteristics of the fuel provided to the engine, and heating the intake air charge (external EGR).

During HCCI combustion, auto-ignition of the combustion chamber gas may be controlled to occur at a desired position of the piston or crank angle to generate desired engine torque, and thus it may not be necessary to initiate a spark from a sparking mechanism to achieve combustion. However, a late timing of the spark plug, after an auto-ignition temperature should have been attained, may be utilized as a backup ignition source in the case that auto-ignition does not occur.

A third type of combustion that may be performed by engine 10, such as in the case where a spark device is included, utilizes the sparking device to initiate (or assist) combustion when the temperature of the combustion chamber gas approaches an auto-ignition temperature (e.g., reaches a level substantially near auto-ignition without achieving combustion). Such a spark assist type of combustion can exhibit increased fuel efficiency and reduce NOx production over that of SI combustion, yet may operate in a higher torque range than compared with HCCI combustion. Spark assist may also offer an overall larger window for controlling temperature at a specified timing in the engine cycle. In other words, without spark assistance a small change in temperature may result in a rather large change in combustion timing, thus affecting engine output and performance. In spark assist mode, it is possible to attain many of the benefits of HCCI combustion, while still relying on spark timing to provide the final energy needed to attain auto-ignition in order to more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate auto-ignition of the remaining air/fuel mixture. Thus, a relatively small cloud of richer gases may be used that are proximate to the spark plug, which can also be homogeneous, stratified, or slightly stratified. One approach to provide such operation may be to utilize a second direct fuel injection in the compression stroke.

One example of an application involving at least the three combustion modes presented above may include the use of SI for startup and/or after engine startup during an engine warming period. After such engine startup and engine warming, the combustion process may transition through spark assist combustion to HCCI combustion for improved fuel economy and emissions. During periods of high engine torque requirements, spark assist may be activated to ensure proper combustion timing. As the engine is returned to a low or moderate torque requirement, the involvement of spark assist may cease in order to realize the full benefits of HCCI.

Note that a plurality of other parameters may affect both the peak combustion temperature and the required temperature for efficient HCCI combustion. These and any other applicable parameters may be accounted for in the routines embedded in engine controller 12 and may be used to determine optimum operating conditions. For example, as the octane rating of the fuel increases, the required peak compression temperature may increase as the fuel requires a higher peak compression temperature to achieve ignition. While one or more of the above combustion modes may be used in some examples, still other combustion modes may be used, such as stratified operation, either with or without spark initiated combustion.

As noted herein, in one example of a compression or auto-ignition capable engine, the intake valve(s) may be actuated either by a high or low lift cam profile depending on the selected combustion mode. The low lift cam profile may be used to trap a high level of residual (exhaust) gas in the cylinder. The trapped gasses promote compression or auto-ignition by increasing the initial charge temperature, in some examples. However, in a spark ignition mode (either high or low loads) the high lift cam profile may be used. Such a switchable cam profile may be achieved through various cam and tappet systems that switch between an inner and outer land, for example. The switching may be achieved through oil flow hydraulic actuators. As another example, such systems may involve an increased number of tappets.

In another embodiment, rather than using a cylinder with a single intake valve (or multiple switchable intake valves) that changes between different profiles, a cylinder with at least two intake valves, where each of the valves has a different lift profile (at least for that cylinder), may be used. During compression or auto-ignition, a higher and/or longer lift intake valve can be disabled through the use of a collapsible tappet, while a lower and/or shorter lift intake valve remains active. During spark ignition, the higher/longer lift intake valve can operate to increase the airflow into the engine, while the lower/shorter lift continues to operate. In other words, the first intake valve can have a lower lift profile, capable on its own of flowing sufficient air to operate the engine in compression or auto-ignition. Further, the first intake valve can have a valve timing (fixed or adjustable) set for compression or auto-ignition. The second intake valve can have a valve lift and/or timing (fixed or adjustable) that provide a balance of air for spark-ignition, over and above the air required for compression or auto-ignition.

Active valve operation may refer to a valve opening and closing during a cycle of the cylinder, where deactivated valves may be held in a closed position for a cycle of the cylinder (or held in a fixed position for the cycle). It will be appreciated that the above configurations are examples and the approaches discussed herein may be applied to a variety of different variable valve lift profile systems and configurations, such as to exhaust systems, as well as systems that have more than two intake or two exhaust valves per cylinder.

Figure 2:
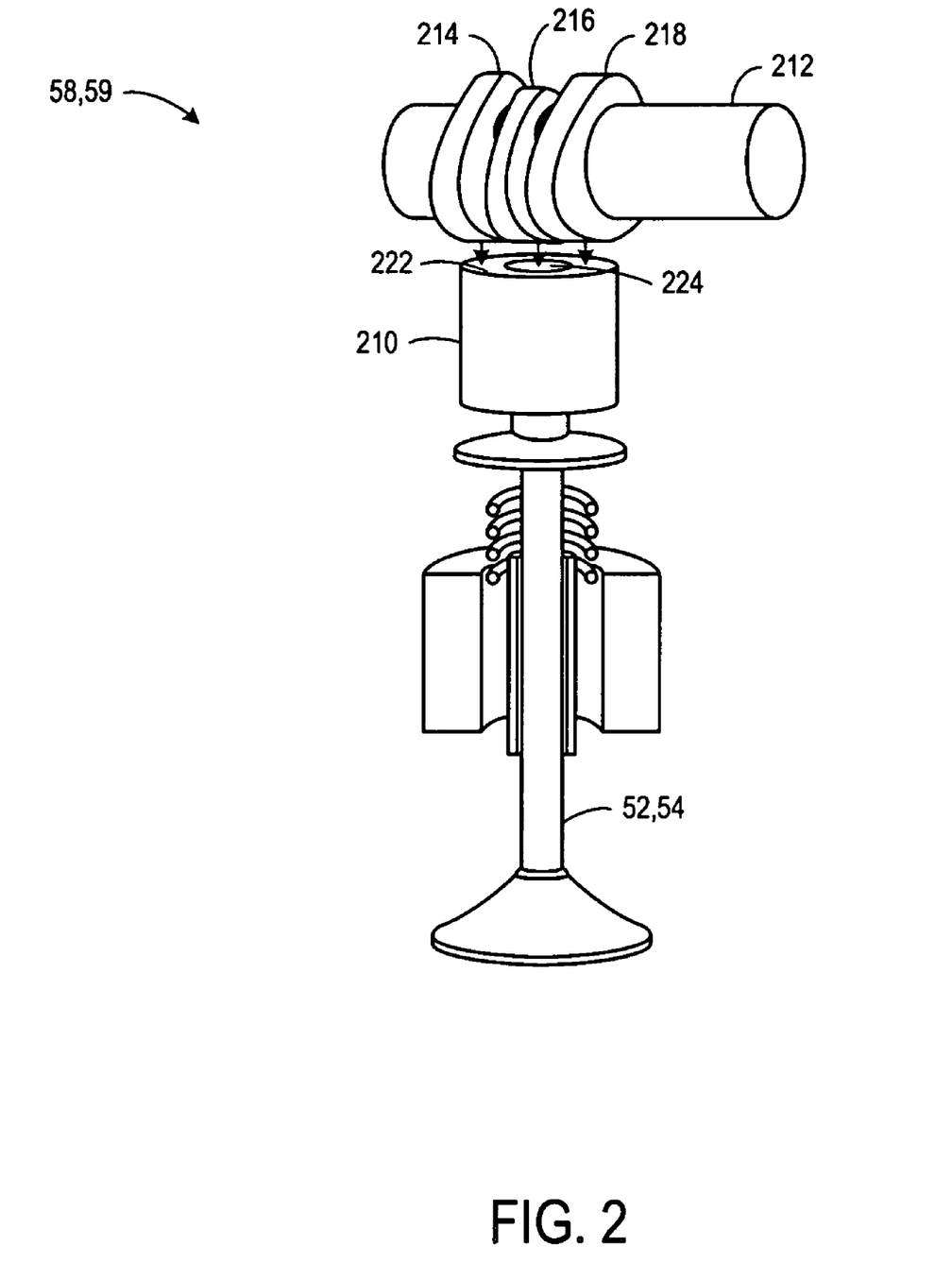
FIG. 2 shows an example of a cam profile switching device configuration that may be used in the engine system of FIG. 1

Turning now to FIG. 2, one example of a cam profile switching device configuration for use with engine system 10 is shown. Camshaft 212 may include cam lobes 214, 216, 218 which may define different lift profiles. Specifically, in this example, cam lobes 214 and 218 may have identical lift profiles and cam lobe 216 may have a different profile. In particular, cam lobes 214 and 218 may have a high lift profile and cam lobe 216 may have a low lift profile. Cam profile switching device 58, 59 may include a switchable tappet 210, depicted in FIG. 3, which may interact with multiple cam lobes of camshaft 212. In particular, cam lobes 214 and 218 may interact with an outer top surface of outer section 222 of switchable tappet 210 and cam lobe 216 may interact with a central top surface of central section 224 of switchable tappet 210. During valve operation, switchable tappet 210 may be actuated as a unit by cam lobes 214 and 218 to generate a high valve lift profile. Alternatively, outer portion 222 may be decoupled from central portion 224 as described in FIG. 3 and switchable tapped 210 may be actuated by cam lobe 216 to generate a low valve lift profile. In some cases, the request to switch the lift profile of the cylinder valve may be generated based on a mode transition from SI operation to HCCI operation and vice versa.

While this example shows an overhead cam engine with a tappet coupled to the valve stems, tappets may also be used with a pushrod engine, and a collapsible tappet may thus be coupled to a pushrod.

Further, the diagram of FIG. 2 shows just one cylinder valve of engine 10, where the engine may be a multiple cylinder engine with each cylinder having multiple valves (intake and/or exhaust) configured the same as, similar to, or different from the one shown in FIG. 2. Further, while the above valve system can provide advantages in an engine having compression or auto-ignition, it may also be used in other engine combustion systems.

Figure 3:
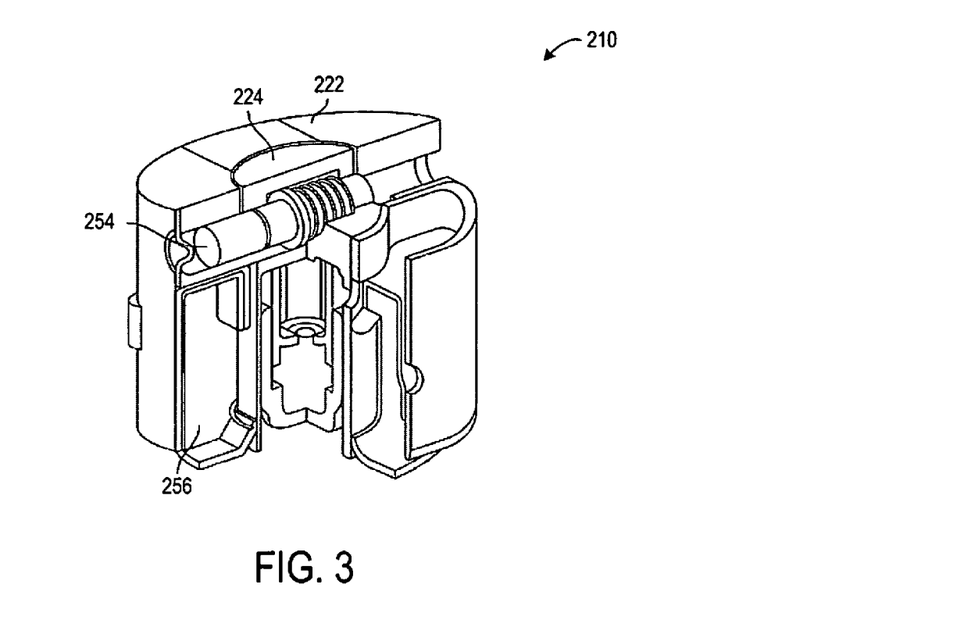
FIG. 3 shows an example of a switchable tappet assembly.

FIG. 3 shows one example of switchable tappet 210 in which locking pin 254 is used to couple or decouple central portion 224 from outer portion 222. In this way, when the pin is in the locked position, the motion caused by contact with profiles 214 and 218 causes the inner portion to follow the motion and thus actuate the valve stem and valve coupled to the inner portion. Alternatively, when the pin is in the unlocked position, a lost motion spring in interior section 256 may cause outer portion 222 to travel separately from central portion 224. Thus, the central portion may actuate the valve stem and valve coupled to the inner portion. Further, because profile 216, which is in contact with central portion 224, has a reduced lift profile, the valve lift may be less than during actuation via cam lobes 214 and 218. In this way, a switchable tappet may be used in which manufacturability of the tappet may be increased, while still retaining the desired action. It will be appreciated that other examples of valve actuation may be used, if desired. For example, the switchable tappet may be used to deactivate operation of a valve by switching between a first lift profile which generates valve lift and a second lift profile that generates little or no valve lift. Further, the valve may be used in combination with other variable valve lifts to create a desired intake or exhaust valve lift profile.

Figure 4:
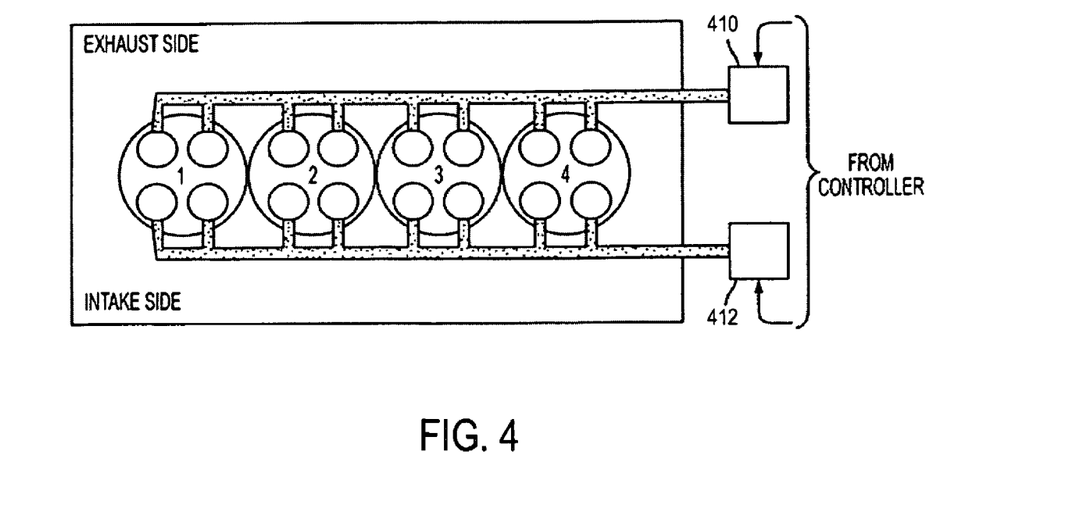
FIG. 4 shows an example of an oil circuit to control actuation of switchable tappets of cylinder valves of an engine system.

In one example, pin 254 may be actuated via hydraulic pressure controlled via a hydraulic valve communicating with the controller to transition the switchable tappet between the locked position and the unlocked position. Further, an oil circuit configuration may be implemented to control tappet switching of different cylinder valves. FIG. 4 shows a four cylinder engine application where an oil circuit may be implemented to control tappet switching of the valves of each of the cylinders. In the illustrated example, the oil circuit configuration may include a first hydraulic actuator 410 and a second hydraulic actuator 412, controlling respective oil pressures to actuators in cylinders one through four as indicated. In this example, the engine firing order is 1-3-4-2, although this is just one example. Continuing with FIG. 4, the two actuators each utilize separate oil galleries for each of the intake tappets and exhaust tappets. This configuration allows independent control of each group of the intake and exhaust valves and may enable sufficient switching windows (depending on response time and switching speeds) for a pre-defined cylinder switching order for both intake and exhaust valves to be achieved. As illustrated, it is possible with such a system to achieve a cylinder switching order that is the same for both the intake and exhaust tappets. In other words, because the cam event switching windows used to achieve both an acceptable and robust switch in a pre-defined cylinder switch order do not overlap between the intake and exhaust sides, separate control for intake and exhaust valves of multiple cylinders may be used to obtain the desired switch order.

In some embodiments, the oil circuit may include additional actuators to control oil pressure in additional oil galleries or for specific groupings of switchable tappets or for individual switchable tappets. For example, an oil circuit configuration may include four actuators to control the oil pressure in four separate oil galleries.

Note that the above approaches may be adapted and/or modified to accommodate alternative firing orders. For example, the oil galleries can be reconfigured to achieve the same or another desired outcome, such as by connecting any two subsequent cylinders in the firing sequence to the same oil gallery. Note that in the above example, the figures show an engine with a single bank of four cylinders. However, the approach may be extended to a V-8 engine, for example, with two engine banks, each having four cylinders. In this case, the firing order of the cylinders of the particular bank may be used to configure the oil galleries, even though the overall engine firing order may switch periodically between banks. In other words, cylinder 3 may fire consecutively after cylinder 1 among the cylinders in the particular bank shown, even though a cylinder in another bank may fire between cylinders 1 and 3.

The above described oil circuit configurations may reduce complexity while providing systems with sufficient repeatability and robustness and sufficient variability to handle a variety of operating conditions where the cylinder switching order can be pre-defined and robustly achieved. Further, it will be appreciated that the above described cam profile switching configuration is one non-limiting example and other suitable cam profile switching configurations may be implemented in the engine system.

During vehicle operation, operational mode switching, and more particularly, cam profile switching may be limited to operational windows in which switching may have reduced or minimal interference with engine operation. In one example, a cam profile switching window may be characterized by a range of crank angles over which a signal may be sent to the actuator to initiate a switch in valve operation. The beginning and ending regions of the windows may defined by the firing order, valve opening durations, etc. Referring to a four cylinder engine configuration like that shown in FIG. 4, for the example mode switch starting with cylinder number 1, the beginning of the exhaust signal window for cylinders 1 and 3 may be defined to be after the opening angle of the exhaust valve for cylinder 3 and the end may be before the exhaust valve opening angle of the high lift cam for cylinder 1. In this example, the switch is controlled so that for the last combustion event in SI mode, the exhaust lift profile is that of the HCCI type, and the first combustion event in HCCI mode uses an intake lift profile of the HCCI type.

Furthermore, for the example mode switch starting with cylinder number 1, the beginning of the intake signal window for cylinders 1 and 3 may be defined to be after the opening angle of the intake valve for cylinder 3 and the end may be before the intake valve opening angle of the high lift cam for cylinder 1. A similar analysis applies for the windows of cylinders 2 and 4, except that the exhaust/intake signal windows for cylinders 2 and 4 may be shifted to correspond with the valve angles of cylinder 2 and 4.

Note that the window start angles, end angles, and/or durations may be different from a transition from HCCI to SI. This may be due to, for example, the different valve opening timings and durations between the different lift profiles. As another example, switching windows change based on changes of cam timing (e.g. advance or retard) or other suitable changes in settings by a variable cam timing (VCT) controller or control component of the control system.

The cam profile switch window may be characterized by a range of crank angles where the hydraulic switch occurs via an oil gallery. However, as described above, many factors may affect the robust control of tappet switch timing and switching order. In one example, when using tappet switching technology having oil galleries, each acting on multiple cylinders, tappet switching may occur when an oil pressure threshold is reached. Thus, the location where each tappet switches may depend upon the dynamics of the oil circuit. Furthermore, if a tappet is being depressed by a cam lobe when the oil pressure threshold is reached, the tappet will not switch until the next rotation of the cam shaft.

Moreover, the inventors herein have recognized that the condition of the engine oil, both in terms of viscosity and temperature, when operating away from ordinary operating conditions, i.e. outlying temperature conditions and/or outlying oil viscosity conditions (due to contamination) may have an effect on the camshaft profile switching response time which if not accounted for may result in cam profile switching that may not be synchronized with fuel or spark causing torque jumps, increased NVH, increased emissions and/or decreased fuel economy performance. Specifically, engine oil quality may affect the timing of the switch in valve operation relative to the timing of sending a signal to initiate the switch in two or more areas including the low and high pressure lines that run within or from the engine to the oil transducers or switchable tappets and the switchable tappets themselves. That is, degraded oil having a different viscosity may slow down or speed up oil transfer in the lines as well as slow down or speed up operation of the internal lock pin of the switchable tappet. For example, as engine oil degrades, the viscous additives may break down within the oil from shearing causing the oil to become thicker; further as the oil continues to degrade the resultant oil may oxidize and become thinner. Thus, over the course of oil degradation the oil viscosity may change which in turn may affect the signal timing of a cam profile switch. Furthermore, a delay in the electronics and solenoid valves and external conditions may affect the timing of the switch in valve operation relative to the timing of sending a signal to initiate the switch. Since accurate control of switching of valve profiles affects transitioning of combustion modes such as from HCCI to SI or vice versa and may affect the operation of compression or auto-ignition combustion, at least some of the factors affecting switching may be taken into account in various control strategies described herein.

In one approach, the cam profile (or tappet) switch timing may be adjusted based on a condition of the engine oil or based on engine oil degradation determined from readings of an engine oil sensor. As discussed above, the engine oil sensor may be configured to provide electrical signals that vary according to a condition of the engine oil. In particular, the electrical signals of the engine oil sensor may characterize a state of oil degradation ranging from fresh clean oil to dirty or sooty oil. Further, as one example, each voltage level of degradation may correspond to a level of oil viscosity which may be considered in the signal timing adjustment.

Figure 5:
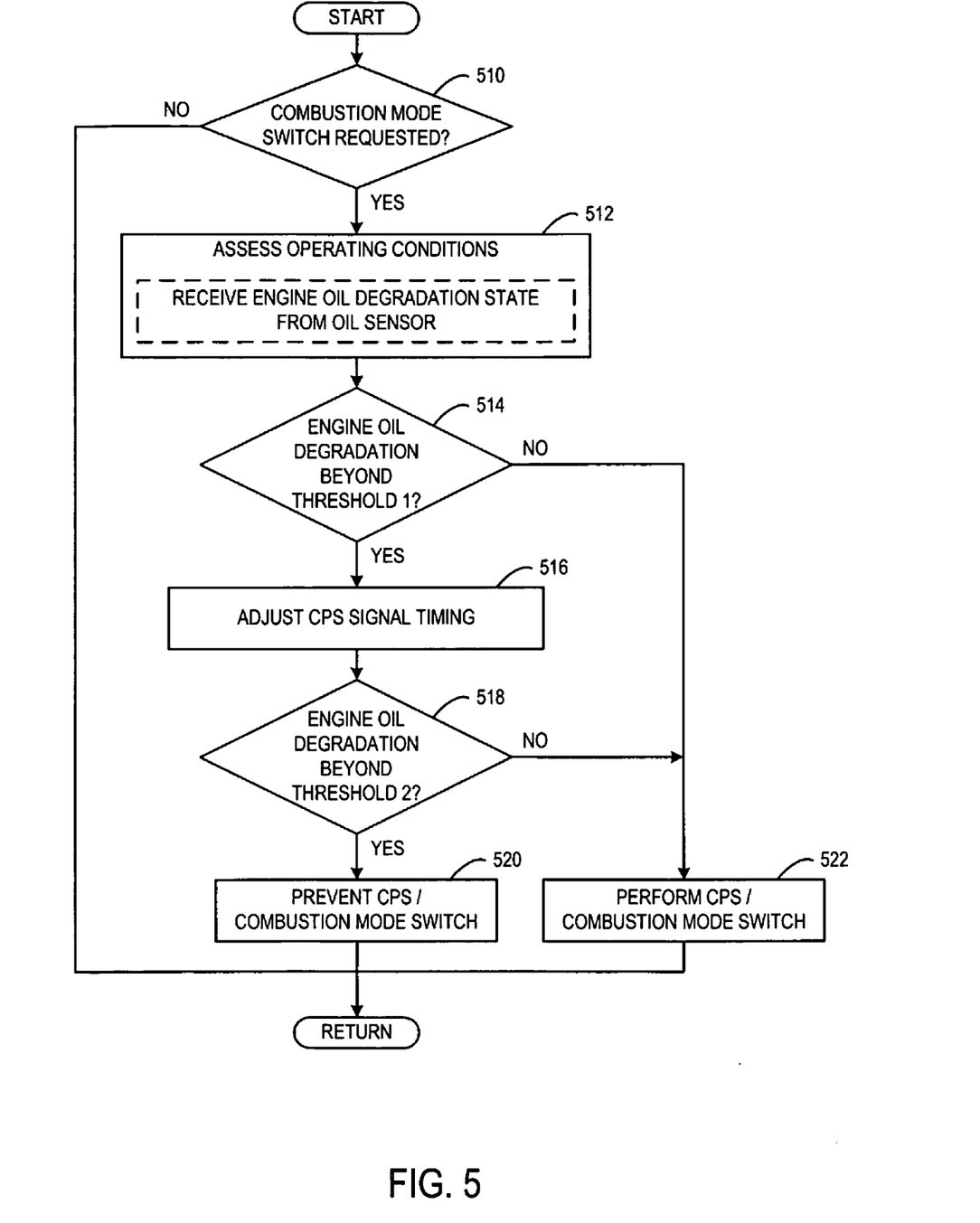
FIG. 5 shows a flowchart corresponding to an example control routine for controlling timing of cam profile switching based on a state of oil degradation.

Referring now to FIG. 5, an example flow chart corresponding to a control routine for adaptive control of valve lift tappet switching based on a degradation condition of the engine oil is shown. The routine begins at 510, where it may be determined if a combustion mode switch is requested. As one example, the request may be to switch from SI combustion to HCCI combustion. As another example, the request may be to switch from HCCI combustion to SI combustion. Still, the request may include a switch to other suitable modes of combustion or engine operation. As discussed above, the request may be initiated in response to meeting various operating conditions. For example, a request to switch to HCCI combustion may be initiated in response to reaching a desired engine speed, load, and temperature condition. If it is determined that a combustion mode switch is requested the routine moves to 512. Otherwise, the routine returns or ends.

At 512, the routine may include assessing the operating conditions of the engine including current, past, and/or future operating conditions. As described above, operating conditions may include, but are not limited to, one or more of the following: a state of engine oil degradation, engine oil temperature, engine oil pressure in one or more of the engine galleries, engine speed, engine load, engine temperature, crankshaft position, cam position, fuel injection amount and/or timing, spark timing, ambient conditions such as air temperature and pressure, among other operating states of the engine. In one particular example, assessing the operating conditions may include receiving a voltage level from an engine oil sensor that corresponds to a state of engine oil degradation which may be retrieved from a lookup table stored in the control system's memory. It will be appreciated that the state of engine oil degradation may have any suitable level of granularity or range to correspond to a sensor signal voltage in order to adjust the signal timing for a cam profile switch.

Next at 514, the routine may include determining if the engine oil has degraded beyond a first threshold level. The determination may include comparing the readings from the engine oil sensor to a range of oil degradation levels. In one example, the first threshold may characterize substantially clean engine oil that does not have a significant change in viscosity due to contamination or degradation. If it is determined that the engine oil is not degraded beyond the first threshold, or in this example, the engine oil is substantially clean, the routine moves to 522 and the cam profile switch or combustion mode switch may be performed without adjustment to the signal timing based on the degradation condition of the engine oil. Otherwise, if it is determined that the engine oil has degraded beyond the first threshold the routine moves to 516.

At 516, the routine may include adjusting the cam profile switch signal timing based on the level of engine oil degradation. In one example, the signal timing may be advanced to account for delays related to the travel of oil due to degradation throughout the oil galleries and other conduits that may affect movement of the lock pin and switching of the tappet. Specifically, the contaminants within the degraded oil may change the viscosity of the oil resulting in faster or slower response times to raise or lower oil pressure. Thus, signal timing may be advanced corresponding to the level of engine oil degradation. It will be appreciated that adjusting the cam profile switch signal timing may include advancing or retarding the signal timing to the appropriate timing based on the condition of the engine oil. Further, adjusting the cam profile switch signal timing may include adjusting the switching window where a cam profile switch may occur. In this way, the cam profile switch may be synchronized with commanded fuel and spark even during combustion mode transitions. In one example, the switching window and correspondingly the signal timing adjustment may be mapped according to oil state and as the oil degrades the window and/or the signal timing may be re mapped or the map may be calibrated or switched to account for delays due to degradation. Further, the redefined maps may be programmed into the control system memory and may be generated from dynamometer testing on a range of aged and viscous oils.

Furthermore, adjusting the signal timing may include adjusting the signal timing for multiple valves. For example, the last SI cycles prior to a combustion mode switch may employ a different fuel and sparking strategy than the first cycles of HCCI combustion mode, thus both intake and exhaust valves may be switched in unison to provide the correct environment for either SI or HCCI combustion. Under some conditions, a plurality of intakes valve may be switched in a coordinated manner. Further, under some conditions, a plurality of exhaust valves may be switched in a coordinated manner. Further still, under some conditions both intake and exhaust valve may be switched in a coordinated manner. In some cases, coordinated valve switching may include simultaneous switching.

At 518, the control routine may include determining if the engine oil has degraded beyond a second threshold level. The determination may include comparing the readings from the engine oil sensor to a range of oil degradation levels. The second threshold level may correspond to a level of severe oil degradation such that a switch in combustion modes may cause jumps in torque output, increased NVH, increased emissions, and/or increased fuel consumption. Accordingly, if it is determined that the engine oil has degraded beyond the second threshold, the routine moves to 520 where the routine may include preventing a cam profile switch and/or a combustion mode switch so that penalties of an unsynchronized switch may be avoided. Otherwise, if it is determined that the engine oil has not degraded beyond the second threshold level, the routine moves to 522 where the routine may include performing the cam profile switch or the combustion mode switch using the adjusted signal timing. By adjusting the cam profile switch signal timing based on the state of oil degradation, a combustion mode switch may be adapted to maintain synchronization and accuracy throughout engine operation even with oil degradation. In this way, jumps in torque output, NVH, emissions, and/or fuel consumption may be reduced.

It will be appreciated that the above described thresholds may characterize various other predefined levels of oil degradation other than those discussed above. Furthermore, in some embodiments, the routine may include additional thresholds whereupon reaching the thresholds a predetermined signal timing adjustment may be made to maintain cam profile switching accuracy and synchronization. In some embodiments, the engine oil degradation state may be dynamically updated at the control system based on changes in sensor voltage and engine operation may be adjusted accordingly.

In another approach, the cam profile (or tappet) switch timing may be adjusted based on engine oil temperature as measured by an engine oil sensor. It will be appreciated that varying states of the engine oil temperature may cause the predefined cam profile switch windows to move. As one particular example, as the temperature of the engine oil varies the viscosity of the oil may change and in the case of great changes in temperature or outlying temperature operating regions the engine oil behavior, that is transfer or response timing, may affect the timing of the operating mode switch and more particularly a cam profile switch. As discussed above, the engine oil sensor may be configured to provide electrical signals that vary according to a temperature of the engine oil. Further, the oil sensor may be positioned proximate to a rotating component to the oil system, such as for example, the camshaft so that an accurate oil temperature may be sent to the control system. The engine oil temperature reading from the oil sensor may have improved accuracy over an engine coolant reading and therefore may facilitate more accurate switching between HCCI and SI operation.

Figure 6:
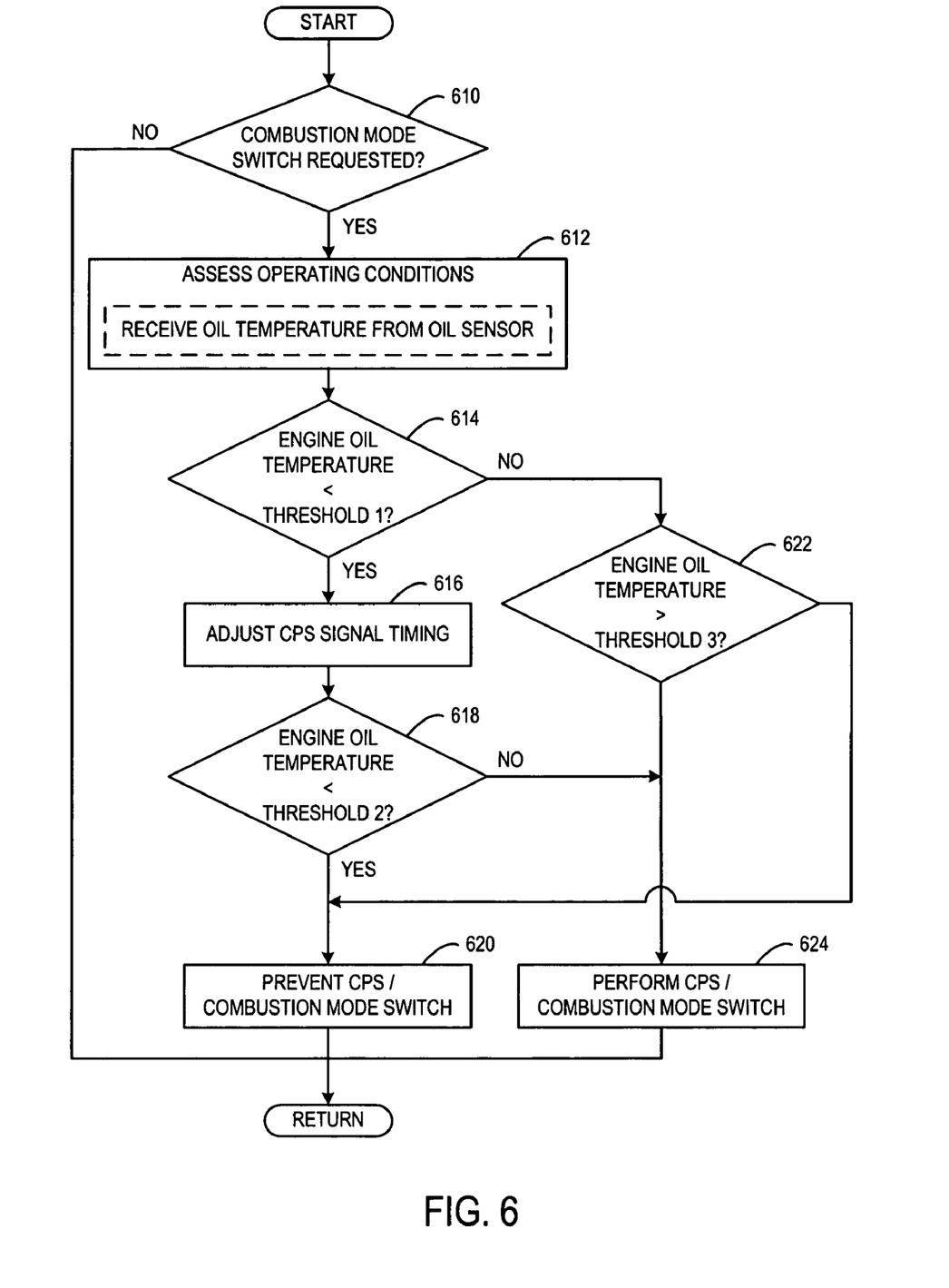
FIG. 6 shows a flowchart corresponding to an example control routine for controlling timing of cam profile switching based on oil temperature.

Referring now to FIG. 6, an example flow chart corresponding to a control routine for adaptive control of valve lift tappet switching based on a temperature condition of the engine oil is shown. The routine begins at 610, where it may be determined if a combustion mode switch is requested. As one example, the request may be to switch from SI combustion to HCCI combustion. As another example, the request may be to switch from HCCI combustion to SI combustion. Still, the request may include a switch to other suitable modes of combustion or engine operation. As discussed above, the request may be initiated in response to meeting various operating conditions. For example, a request to switch to HCCI combustion may be initiated in response to reaching a desired engine speed, load, and temperature condition. If it is determined that a combustion mode switch is requested the routine moves to 612. Otherwise, the routine returns or ends.

At 612, the routine may include assessing the operating conditions of the engine including current, past, and/or future operating conditions. As described above, operating conditions may include, but are not limited to, one or more of the following: a state of engine oil degradation, engine oil temperature, engine oil pressure in one or more of the engine galleries, engine speed, engine load, engine temperature, crankshaft position, cam position, fuel injection amount and/or timing, spark timing, ambient conditions such as air temperature and pressure, among other operating states of the engine. In one particular example, assessing the operating conditions may include receiving a voltage from an engine oil sensor that corresponds to a temperature of the engine oil measured directly from the engine oil film of the rotating camshaft.

Next at 614, the routine may include determining if the engine oil temperature has been reduced beyond a first threshold temperature. The threshold may be set based on the viscosity of engine oil and oil transfer behavior mapped to the oil temperature. For example, the threshold temperature may be set to a point where the oil viscosity delays response time. The threshold may be calibratible and/or may be predefined based on testing of oil response behavior across different temperatures of engine operation and may be stored in a lookup table in memory of the control system. Further, the threshold may be set based on the operating temperature range of HCCI combustion. If the oil temperature is below an operational range where HCCI combustion may occur the mode switch may be adjusted or prevented. If it is determined that the oil temperature received from the oil sensor is not below the threshold temperature the routine moves to 622. Otherwise, if it is determined that the engine oil temperature has lowered beyond the first threshold temperature the routine moves to 616.

At 616, the routine may include adjusting the cam profile switch signal timing based on the engine oil temperature received from the oil sensor. In other words, the signal timing may be adjusted to account for delays related to the travel of oil throughout the oil galleries and other conduits that may affect movement of the lock pin and switching of the tappet. The delays may be due to the lower viscosity of the oil due to a lowered temperature resulting in slower response times to raise or lower oil pressure. Adjusting the cam profile switch signal timing may include advancing or retarding the signal timing to the appropriate timing based on the temperature. In particular, the signal timing may be advanced as the engine oil temperature decreases to account for delays and the signal timing may be retarded as engine oil temperature decreases since the engine oil viscosity may be higher resulting in quicker travel through the oil galleries. Further, adjusting the cam profile switch signal timing may include adjusting the switching window where a cam profile switch may occur. In this way, the cam profile switch may be synchronized with commanded fuel and spark even during combustion mode transitions. In one example, the switching window and correspondingly the signal timing delay may be mapped according to oil state and as the oil temperature decreases the window and/or the signal timing may be re mapped or the map may be calibrated or switched to account for delays due to oil temperature. Further, the redefined maps may be programmed into the control system memory and may be generated from dynamometer testing on a range of viscous oils at different temperatures.

Furthermore, adjusting the signal timing may include adjusting the signal timing for only one valve or multiple valves. For example, the last SI cycles prior to a combustion mode switch may employ a different fuel and sparking strategy than the first cycles of HCCI combustion mode, thus both intake and exhaust valves may be switched in unison to provide the correct environment for either SI or HCCI combustion. Under some conditions, a plurality of intakes valves may be switched in a coordinated manner. Further, under some conditions, a plurality of exhaust valves may be switched in a coordinated manner. Further still, under some conditions both intake and exhaust valves may be switched in a coordinated manner. In some cases, coordinated valve switching may include simultaneous switching.

At 618, the control routine may include determining if the engine oil temperature is less than a second threshold temperature. The determination may include comparing the readings from the engine oil sensor to a temperature range of HCCI operation. The second threshold level may correspond to an oil temperature below the operating range of the HCCI combustion such that a switch in combustion modes may cause jumps in torque output, increased NVH, increased emissions, and/or increased fuel consumption. Accordingly, if it is determined that the engine oil temperature is below the second threshold temperature, the routine moves to 620 where the routine may include preventing a cam profile switch and/or a combustion mode switch so that penalties of an unsynchronized switch may be avoided. Otherwise, if it is determined that the engine oil temperature is not lower than the second threshold temperature, the routine moves to 624 where the routine may include performing the cam profile switch or the combustion mode switch using the adjusted signal timing.

Returning to 614, if the engine oil temperature is not reduced below the first threshold the routine moves to 622. At 622, the routine may include determining if the engine oil temperature is above a third threshold temperature that is higher than the first and second threshold temperatures. In one example, the third threshold temperature may be a temperature where auto-ignition combustion or HCCI combustion may not be possible/desirable. If it is determined that the engine oil temperature is at or above the third threshold temperature the routine moves to 620 where the routine may include preventing a cam profile switch and/or a combustion mode switch so that penalties associated with unsuitable auto-ignition combustion may be avoided. Otherwise, if it is determined that the engine oil temperature is lower than the third threshold temperature, the routine moves to 624 where the routine may include performing the cam profile switch or the combustion mode switch without adjustment to the signal timing based on the temperature of the engine oil. By adjusting the cam profile switch signal timing based on the oil temperature, a combustion mode switch may be adapted to maintain synchronization and accuracy throughout engine operation with greater accuracy than control only based on engine coolant temperature. In this way, jumps in torque output, NVH, emissions, and/or fuel consumption may be reduced and/or possibly eliminated.

It will be appreciated that the above described thresholds may characterize various other predefined temperatures other than those discussed above. Furthermore, in some embodiments, the routine may include additional thresholds whereupon reaching the thresholds a predetermined signal timing adjustment may be made to maintain cam profile switching accuracy and synchronization.

Figure 7:
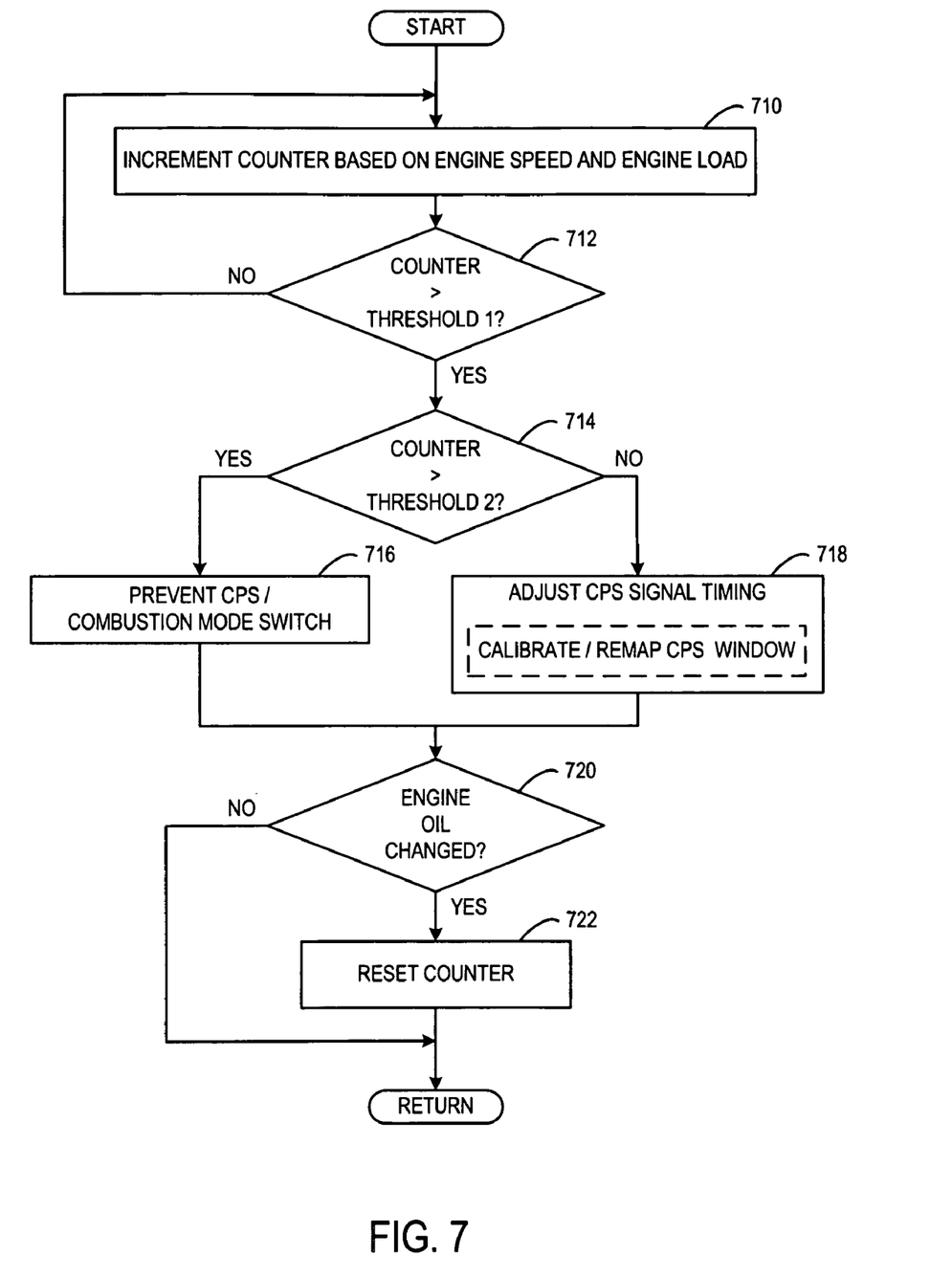
FIG. 7 shows a flowchart corresponding to an example control routine for approximating a state of oil degradation.

In another approach, engine oil degradation may be predicted utilizing a counter cycle algorithm that updates a revised cam profile switch or operating mode switch request. Referring now to FIG. 7, an example flow chart corresponding to a control routine for adaptive control of valve lift tappet switching based on predicative oil deterioration is shown. The routine begins at 710, where the routine may include incrementing a counter based on engine speed and engine load. The counter cycle may be actuated and stopped based on the crankshaft position sensor. In some embodiments, the counter may be incremented based on alternative or additional operating parameters.

Next at 712, the routine may include determining if the counter is greater than a first threshold. The first threshold may be set according to a predetermined review stage generated from dynamometer testing on a range of aged and viscous oils. The first threshold may represent a predicted point at which engine oil degradation may affect signal timing, thus causing the cam profile switch timing to be adjusted. If the counter is greater than the first threshold the routine moves to 714. Otherwise, the routine loops to the beginning and does not adjust the cam profile switching signal timing.

At 714, the routine may include determining if the counter is greater than a second threshold. The second threshold may be set according to a predicted point at which oil degradation is severe enough that an operating mode switch may cause significant operating penalties such as misfires, NVH (e.g. engine knock), increased emissions, etc. If the counter is greater than the second threshold the routine moves to 716 where the routine may include preventing a cam profile switch or a combustion mode switch such as a switch from SI to HCCI operation. Otherwise, the counter is not greater than the second threshold and the routine moves to 718 where the routine may include adjusting the cam profile switch signal timing to accommodate for the predicted oil degradation. In some embodiments, the cam profile timing may be adjusted by selecting the revised cam profile switch request from a pre mapped calibration.

At 720, the routine may include determining if the oil has been changed and thus the oil degradation condition has been improved. In some embodiments, the state of the engine oil (or the counter) may be manually reset in the controller during an oil change service such as by a technician. Further, in some embodiments engine oil replacement may be indicated by an ignition key on/off procedure. Further, an indication of an oil change may be generated by an engine oil system sensor in response to detecting removal of an oil change service related component such as the oil pan drain or an oil filter, for example. If it is determined that the oil has been changed the routine moves to 722 where the routine may include resetting the counter. Otherwise, it may be determined that the oil has not been changed and the routine ends.

The above described routine may provide suitable adjustment of operating mode switching control through engine operation based on predicted engine oil degradation without use of an engine oil sensor. In particular, the routine may adjust the signal timing of a cam profile switch by advancing or retarding the signal. Furthermore, the cam profile switch may be prevented based on a predicted severe level of engine oil degradation. By adjusting the cam profile switch signal based on predicted oil degradation, valve lift and/or timing may be synchronized with fuel and spark throughout the ranges and modes of engine operation. In this way, jumps in torque output, NVH, emissions, and/or fuel consumption may be reduced.

It will be appreciated that various parts of the above described control routines may be combined or omitted to provide suitable control of engine operation. For example, signal timing of a cam profile switch may be adjusted based on both an oil degradation condition and an oil temperature condition. Further, a magnitude of advancement or retardation of the signal timing may be increased and/or reduce in light of both conditions. In one example, the signal timing may be retarded by a predetermined delay due to the degradation condition of the engine oil; however the delay may be offset or adjusted by a predetermined advancement based on the temperature of the engine oil being high. By taking into consideration both oil degradation and oil temperature signal timing accuracy may be improved. In this way, a cam profile switch may be synchronized with fuel and spark during a transition between combustion modes across the operating range of the engine.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling cylinder valve switching between a first valve condition and a second valve condition for transitioning between combustion modes of an engine, comprising:
adjusting timing of a signal to switch between the first and second valve conditions based on an oil degradation condition from an oil sensor and further based on an oil temperature from the oil sensor, wherein the combustion modes include spark ignition and homogenous charge compression ignition.

2. The method of claim 1, further comprising:
performing the switch between the first and second valve conditions without a signal timing adjustment based on the oil degradation condition being above a first threshold degradation level.

3. The method of claim 2, further comprising:
preventing the switch between the first and second valve conditions based on the oil degradation condition being below a second threshold degradation level.

4. The method of claim 1, wherein the switch between the first and second valve conditions includes coordinated switching of valve lift profiles of intake and exhaust valves of a cylinder of the engine.

5. The method of claim 1, wherein the first valve condition and the second valve condition are different valve lift profiles.

6. The method of claim 1, wherein switching between the first valve condition and the second valve condition includes adjusting a lift profile of a valve by switching between a first camshaft lobe and a second camshaft lobe of a common camshaft via actuation of a valve tappet, the first camshaft lobe having a high lift profile and the second camshaft lobe having a low lift profile.

7. The method of claim 6, wherein the signal initiates a change in oil pressure of at least one oil gallery to change a state of a valve tappet.

8. The method of claim 1, wherein switching between the first valve condition and the second valve condition includes changing a lift profile of a cylinder including at least two intake valves or two exhaust valves, and changing the lift profile of the cylinder includes deactivating actuation of one of the two intake valves or the two exhaust valves to change the lift profile of the cylinder.

9. A system for operating an engine of a vehicle, the engine having at least a first cylinder, the system comprising:
- a camshaft having at least a first lift profile and a second lift profile, the first lift profile differing from the second lift profile;
- a valve of the cylinder actuated via the camshaft, the valve having an actuating tappet configured to switch between a first lift state where valve lift is based on at least the first profile and a second lift state where valve lift is based on at least the second profile;
- an oil sensor to measure engine oil degradation;
- a controller configured to send a signal to actuate the tappet to switch between the first lift state and the second lift state based on a request to transition between spark ignition and homogenous charge compression ignition combustion modes, where a timing of sending the signal is adjusted in response to information from the oil sensor.

10. The system of claim 9, wherein the oil sensor includes a sacrificial portion that wears based on abrasion or corrosive reactions with contaminants in the engine oil, the degradation state based on the wear of the sacrificial portion.

11. The system of claim 10, wherein the degradation state is based on a distance between an end of the sacrificial portion and a sensor target as measured by the oil sensor.

12. The system of claim 9, wherein the information from the oil sensor further includes a temperature of the engine oil.

13. The system of claim 12, wherein the oil sensor includes a robust thermocouple positioned proximate to the camshaft and the oil sensor is configured to measure the temperature of the oil film across the camshaft.

14. The system of claim 9, wherein the oil sensor is integrated with at least one of an oil filler cap and an oil dipstick of the vehicle.

15. The system of claim 9, further comprising:
- a second valve actuated via a third cam profile of the camshaft; wherein actuation of the tappet deactivates the first valve.

16. A method to control valve switching for transitioning between combustion modes of an engine, the engine having a plurality of cylinders, each with at least a first valve profile and a second valve profile, where the first and second valve profiles are changed by switching tappets controlled by an oil circuit, comprising:
- sending a signal to the oil circuit to switch the tappets to transition combustion modes;
- receiving oil temperature and oil degradation information from an oil sensor; and
- adjusting a timing of sending the signal based on the oil temperature and oil degradation information.

17. The method of claim 16, wherein the combustion modes include spark ignition and homogenous charge compression ignition.

18. The method of claim 17, further comprising:
- preventing a combustion mode transition based on at least one of the oil temperature and oil degradation information.

19. The method of claim 16, wherein adjusting includes at least one of advancing the signal timing as the engine oil degrades and engine oil temperature decreases and retarding the signal timing as the engine oil temperature increases.

* * * * *